(12) United States Patent
Zhang

(10) Patent No.: US 9,764,754 B2
(45) Date of Patent: Sep. 19, 2017

(54) PUSH CART

(71) Applicant: Ningbo Wentai Sport Equipment Co., Ltd., Ningbo (CN)

(72) Inventor: Sheng Zhang, Ningbo (CN)

(73) Assignee: NINGBO WENTAI SPORT EQUIPMENT CO., LTD., Ningbo (CN)

( * ) Notice: Subject to any disclaimer, the term of this patent is extended or adjusted under 35 U.S.C. 154(b) by 174 days.

(21) Appl. No.: 14/792,640

(22) Filed: Jul. 7, 2015

(65) Prior Publication Data
US 2016/0185374 A1  Jun. 30, 2016

(30) Foreign Application Priority Data

Dec. 26, 2014  (CN) .................... 2014 2 0845045 U

(51) Int. Cl.
*A63B 55/60* (2015.01)
*B62B 3/12* (2006.01)
*B62B 3/02* (2006.01)
*B62B 5/06* (2006.01)

(52) U.S. Cl.
CPC ............... *B62B 3/12* (2013.01); *A63B 55/60* (2015.10); *B62B 3/02* (2013.01); *B62B 5/067* (2013.01); *A63B 2210/50* (2013.01); *B62B 2202/404* (2013.01); *B62B 2205/12* (2013.01); *B62B 2205/123* (2013.01)

(58) Field of Classification Search
CPC .. B62B 3/02; B62B 3/12; B62B 5/067; B62B 2202/404; B62B 2205/12; B62B 2205/123; A63B 55/60; A63B 2210/50
See application file for complete search history.

(56) References Cited

U.S. PATENT DOCUMENTS

| | | | | |
|---|---|---|---|---|
| 5,647,601 A | * | 7/1997 | Potter | B62B 7/00 280/33.998 |
| 6,390,216 B1 | * | 5/2002 | Sueshige | B60K 1/04 180/208 |
| 6,685,214 B2 | * | 2/2004 | Gregory | A63C 11/026 280/47.29 |
| 6,695,324 B1 | * | 2/2004 | Wu | B62B 1/045 280/40 |
| 6,863,297 B2 | * | 3/2005 | Shapiro | B62B 1/206 280/642 |

(Continued)

FOREIGN PATENT DOCUMENTS

| | | | | |
|---|---|---|---|---|
| DE | WO 2006061032 A1 | * | 6/2006 | B62B 1/125 |
| DE | 102006057156 A1 | * | 6/2007 | B62B 1/042 |

*Primary Examiner* — J. Allen Shriver, II
*Assistant Examiner* — Steve Clemmons
(74) *Attorney, Agent, or Firm* — Matthias Scholl, PC; Matthias Scholl

(57) ABSTRACT

A push cart, including: a frame, a rear wheel assembly, a front wheel assembly, a connection rod linkage. The frame includes an upper frame and a lower frame, and the upper frame is disposed on the lower frame. The rear wheel assembly is movably disposed on the lower frame or the upper frame. The front wheel assembly is disposed on the lower frame. The frame is connected to the rear wheel assembly via the connection rod linkage. The rotation of the upper frame or the lower frame drives the connection rod linkage to flatten the rear wheel assembly with the upper frame or the lower frame, or to unfold the rear wheel assembly.

7 Claims, 14 Drawing Sheets

(56) References Cited

U.S. PATENT DOCUMENTS

| | | | |
|---|---|---|---|
| 7,000,939 B2* | 2/2006 | Shapiro | B62B 3/02 |
| | | | 280/642 |
| 7,137,644 B2* | 11/2006 | Kimberley | B62B 3/12 |
| | | | 280/651 |
| 8,500,140 B1* | 8/2013 | Liao | B62B 7/10 |
| | | | 280/38 |
| 8,500,153 B2* | 8/2013 | Liao | B62B 3/02 |
| | | | 280/47.26 |
| 8,544,871 B1* | 10/2013 | Liao | B62B 3/02 |
| | | | 280/62 |
| 9,227,649 B2* | 1/2016 | Wu | B62B 7/083 |
| 9,469,322 B2* | 10/2016 | Du Toit | B62B 5/0033 |
| 2002/0163163 A1* | 11/2002 | Shapiro | B62B 1/206 |
| | | | 280/643 |
| 2016/0184676 A1* | 6/2016 | Murabe | B62B 5/0043 |
| | | | 180/216 |

* cited by examiner

PUSH CART

CROSS-REFERENCE TO RELATED APPLICATIONS

Pursuant to 35 U.S.C. §119 and the Paris Convention Treaty, this application claims the benefit of Chinese Patent Application No. 201420845045.4 filed Dec. 26, 2014, the contents of which are incorporated herein by reference.

BACKGROUND OF THE INVENTION

Field of the Invention
The invention relates to a golf push cart.
Description of the Related Art
Typically, a golf push cart includes an upper frame, a lower frame, a front wheel assembly, and a rear wheel assembly. After being folded, the front wheel and the rear wheel are vertical to the ground, thereby occupying a large area and causing inconvenient carrying and storage.

SUMMARY OF THE INVENTION

In view of the above-described problems, it is one objective of the invention to provide a golf push cart, of which the upper frame, the lower frame, and the rear wheels can be folded by one step. The folded rear wheels are flattened to be parallel to the lower frame, thereby reducing the occupied space and favoring the carrying and storage of the push cart.

To achieve the above objectives, in accordance with an aspect of the invention, there provided is a push cart, comprising: a frame, a rear wheel assembly, a front wheel assembly, a connection rod linkage. The frame comprises an upper frame and a lower frame, and the upper frame is disposed on the lower frame. The rear wheel assembly is movably disposed on the lower frame or the upper frame. The front wheel assembly is disposed on the lower frame. The frame is connected to the rear wheel assembly via the connection rod linkage. The rotation of the upper frame or the lower frame drives the connection rod linkage to flatten the rear wheel assembly with the upper frame or the lower frame, or to unfold the rear wheel assembly.

In a class of the embodiment, the connection rod linkage comprises at least one linkage unit. The linkage unit comprises a first connection rod, a first sliding block, and a second connection rod. The first connection rod is connected to the upper frame and the first sliding block, or is connected to the lower frame and the first sliding block. The second connection rod is connected to the first sliding block and the rear wheel assembly; and the first sliding block is slidably disposed on the upper frame or the lower frame.

In a class of the embodiment, the rear wheel assembly is movably disposed on the lower frame. The second connection rod is connected to the rear wheel assembly via a fixed seat. The lower frame comprises a rear wheel mounting pipe. The fixed seat is movably disposed on the rear wheel mounting pipe; and the fixed seat is fixedly connected to the rear wheel assembly.

In a class of the embodiment, the upper frame comprises an upper pipe and a handlebar disposed on top of the upper pipe. The lower frame comprises two lower frame pipes disposed in parallel on the rear wheel mounting pipe. The upper pipe is rotatably disposed on the rear wheel mounting pipe. The connection rod linkage comprises two linkage units, the first slide of one linkage unit is disposed on one lower frame pipe, and the first slide of the other linkage unit is disposed on the other lower frame pipe.

In a class of the embodiment, the rear wheel mounting pipe is provided with a joint seat and two seat sleeves. The joint seat is sandwiched in the two seat sleeves. The upper pipe is inserted in the joint seat, and the two lower frame pipes are inserted in the two seat sleeves, respectively.

A folding buckle is disposed at an outer side of the joint seat, and the joint seat is located in an opening of the folding buckle; two ends of the folding buckle are coupled to the joint seat via a rotating shaft; a tube plug is disposed in the joint seat, and the tube plug comprises a second sliding block and an elastic resetting mechanism operating to reset the second sliding block.

A fixed bolt runs through the folding buckle, the joint seat, the tube plug and the second sliding block. The fixed bolt is adapted to drive the second sliding block to slide up and down in the joint seat. The two seat sleeves each comprise a first locking groove and a second locking groove; when the push cart is in an unfolded state, two ends of the fixed bolt are clamped in two first locking grooves of the two seat sleeves, respectively; and when the push cart is in a folded state, two ends of the fixed bolt are clamped in two second locking grooves of the two seat sleeves, respectively.

In a class of the embodiment, the elastic resetting mechanism comprises a spring, and the second sliding block is located below the spring.

In a class of the embodiment, the fixed seat is provided with an installation seat, and the second connection rod is connected to the fixed seat via the installation seat.

In a class of the embodiment, the fixed seat comprises a first base plate and two first side plates respectively disposed at two sides of the first base plate. The rear wheel assembly is fixedly connected to the first base plate; one end of the rear wheel mounting pipe is disposed between the two first side plates; and the fixed seat is connected to the connection rod linkage.

In a class of the embodiment, the installation seat comprises a second base plate and two second side plates respectively disposed at two sides of the second base plate. The second base plate is located at an outer side of the first side plate and connected to the first side plate.

In a class of the embodiment, the installation seat comprises a first spherical connector, the first sliding block is provided with a second spherical connector, one end of the second connection rod is provided with a first spherical joint, and another end of the second connection rod is provided with a second spherical joint. The first spherical joint corresponds to and is received by the first spherical connector, and the second spherical joint corresponds to and is received by the second spherical connector.

In a class of the embodiment, the upper frame comprises two parallel disposed upper pipes and a handlebar disposed on top of the two upper pipes. The lower frame comprises a lower frame pipe disposed on the rear wheel mounting pipe. The lower frame pipe is adapted to rotate relative to the rear wheel mounting pipe. The upper pipe is disposed on the rear wheel mounting pipe. The connection rod linkage comprises two linkage units, the first slide of one linkage unit is disposed on one upper pipe, and the first slide of the other linkage unit is disposed on the other upper pipe.

In a class of the embodiment, the rear wheel mounting pipe is provided with two joint seats and a seat sleeve. The seat sleeve is sandwiched in the two joint seats. The two upper pipes are inserted in the two joint seats, respectively, and the lower frame pipe is inserted in the seat sleeve.

A folding buckle is disposed at an outer side of the seat sleeve, and the seat sleeve is located in an opening of the folding buckle; two ends of the folding buckle are coupled to the seat sleeve via a rotating shaft; a tube plug is disposed in the seat sleeve, and the tube plug comprises a second sliding block and an elastic resetting mechanism operating to reset the second sliding block.

A fixed bolt runs through the folding buckle, the seat sleeve, the tube plug and the second sliding block. The fixed bolt is adapted to drive the second sliding block to slide up and down in the joint seat. The two joint seats each comprise a first locking groove and a second locking groove; when the push cart is in an unfolded state, two ends of the fixed bolt are clamped in two first locking grooves of the two joint seats, respectively; and when the push cart is in a folded state, two ends of the fixed bolt are clamped in two second locking grooves of the two joint seats, respectively.

In a class of the embodiment, the elastic resetting mechanism comprises a spring, and the second sliding block is located behind the spring.

Advantages of the push cart according to embodiments of the invention are summarized as follows. The rear wheel assemblies are movably disposed on the frame. The frame comprises an upper frame and a lower frame. The frame and the rear wheel assemblies are connected via the connection rod linkage. The rotation of the upper frame drives the connection rod linkage to rotate and drive the fixed seats to flatten the rear wheel assemblies, or to enables the rear wheel assemblies and the fixed seats to be vertical to the lower frame. To fold the push cart, the upper frame or the lower frame is first rotated, and drives the connection rod linkage to move. The connection rod linkage drives the rear wheel assemblies to rotate. When the upper frame is flattened with the lower frame, the rear wheels of the rear wheel assemblies are parallel to the upper frame or the lower frame, so that the folding of the upper frame, the lower frame, and the two rear wheels are achieved by one step. The folded push cart has a small volume, thereby being convenient for carrying and storage.

DETAILED DESCRIPTION OF THE EMBODIMENTS

Figure 1:
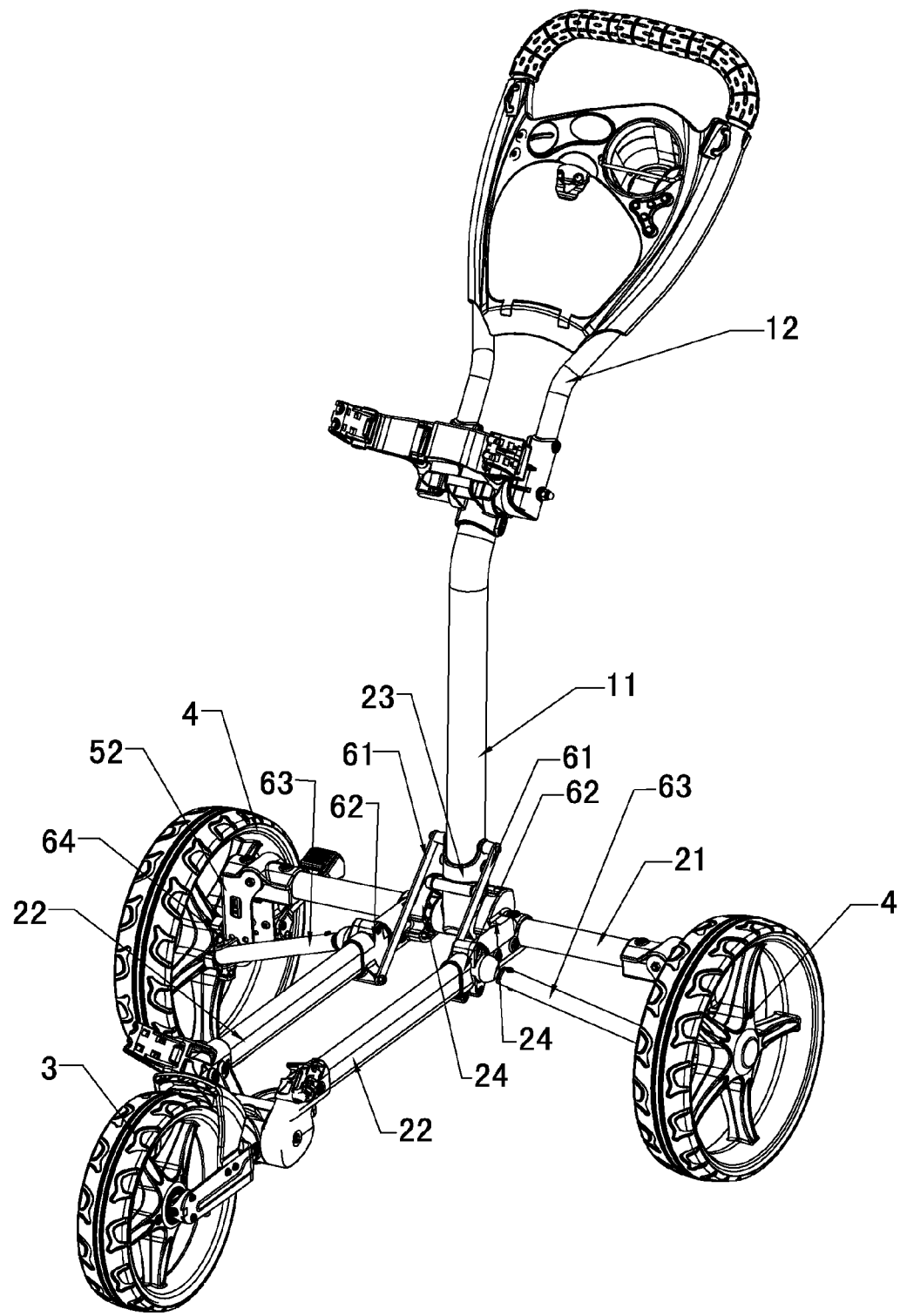
FIG. 1 is a stereogram of a push cart in an unfolded state in Example 1 of the invention.
Figure 2:
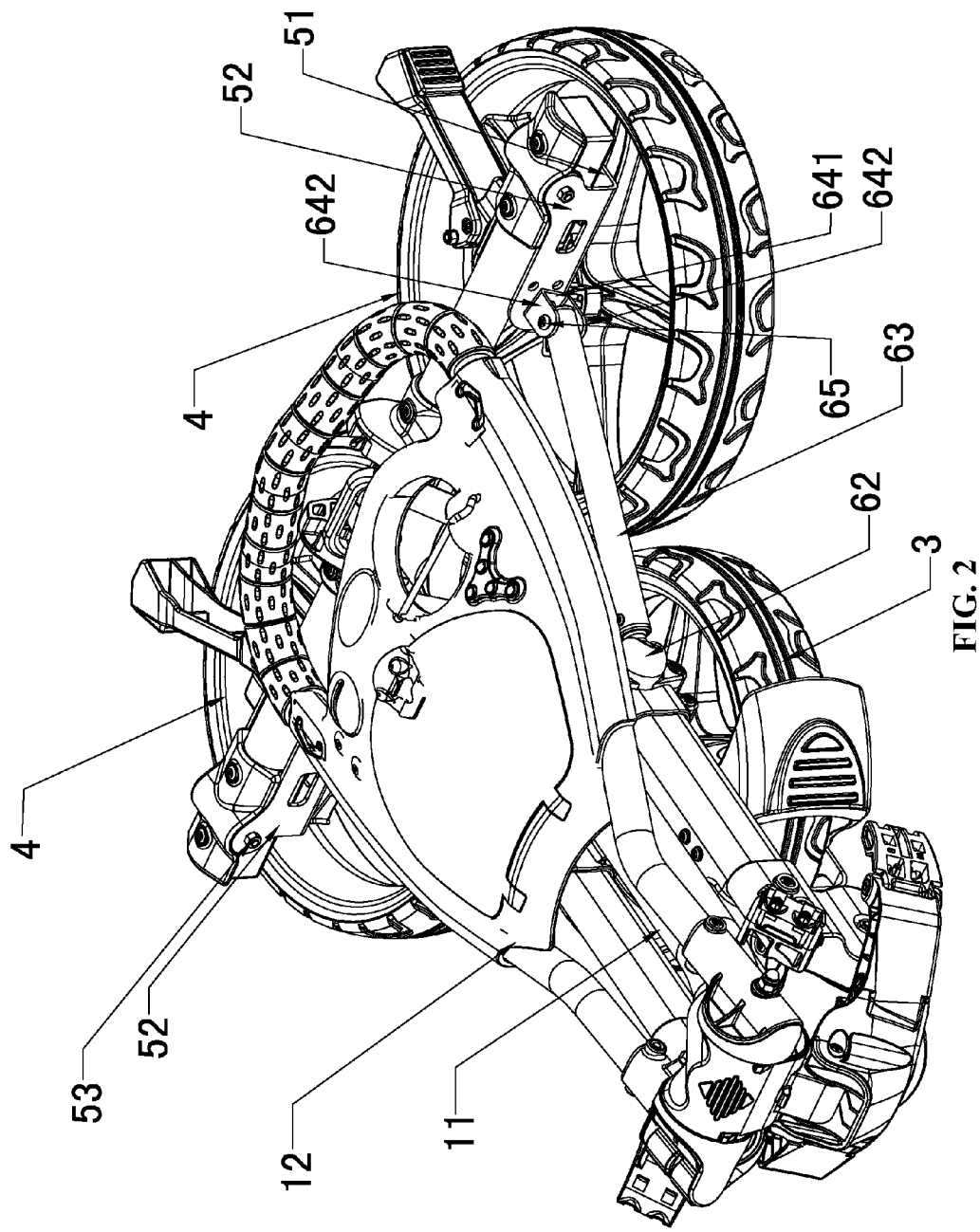
FIG. 2 is a stereogram of a push cart in a folded state in Example 1 of the invention.
Figure 3:
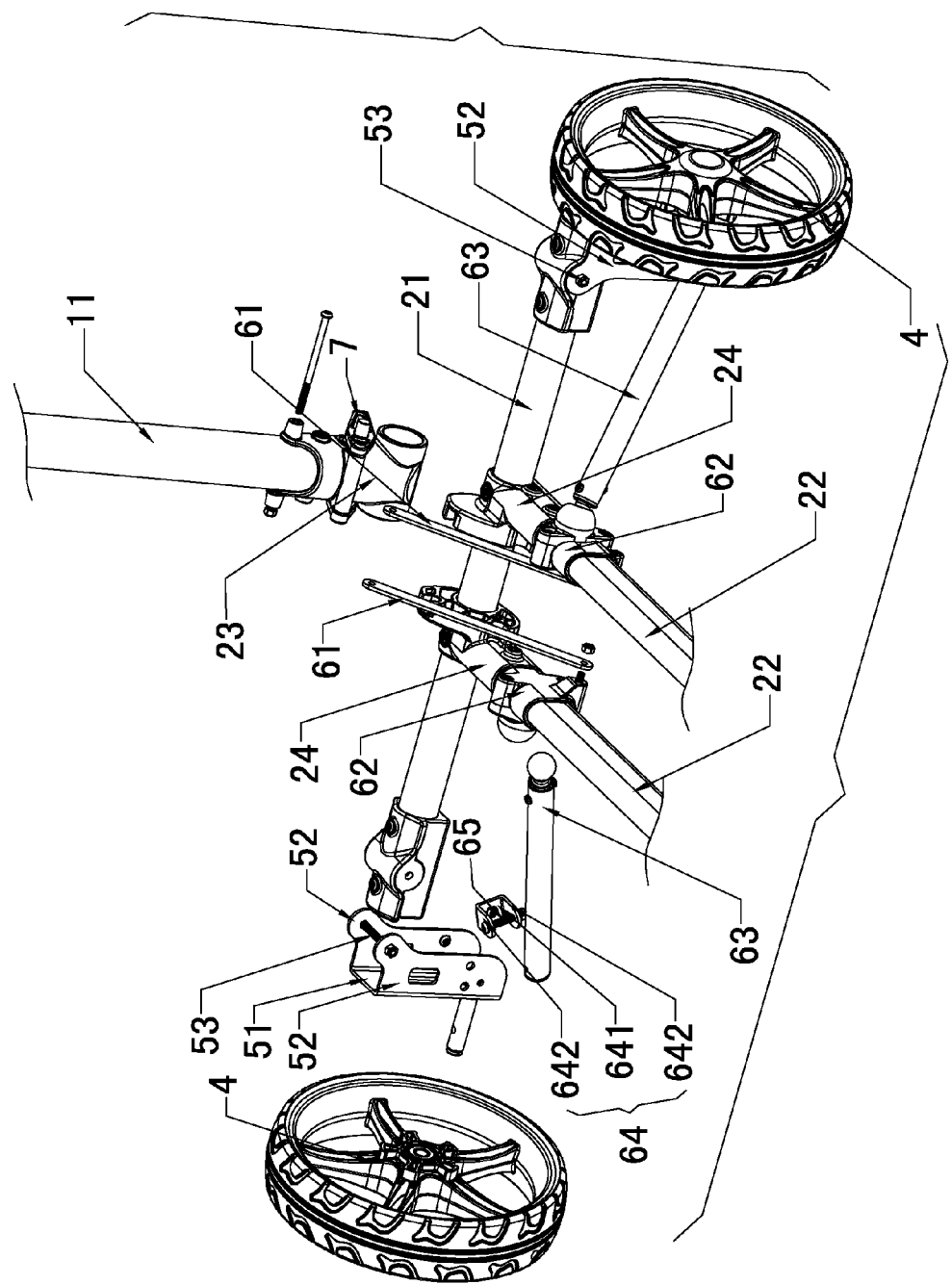
FIG. 3 is a first local exploded view of a push cart in Example 1 of the invention.
Figure 4:
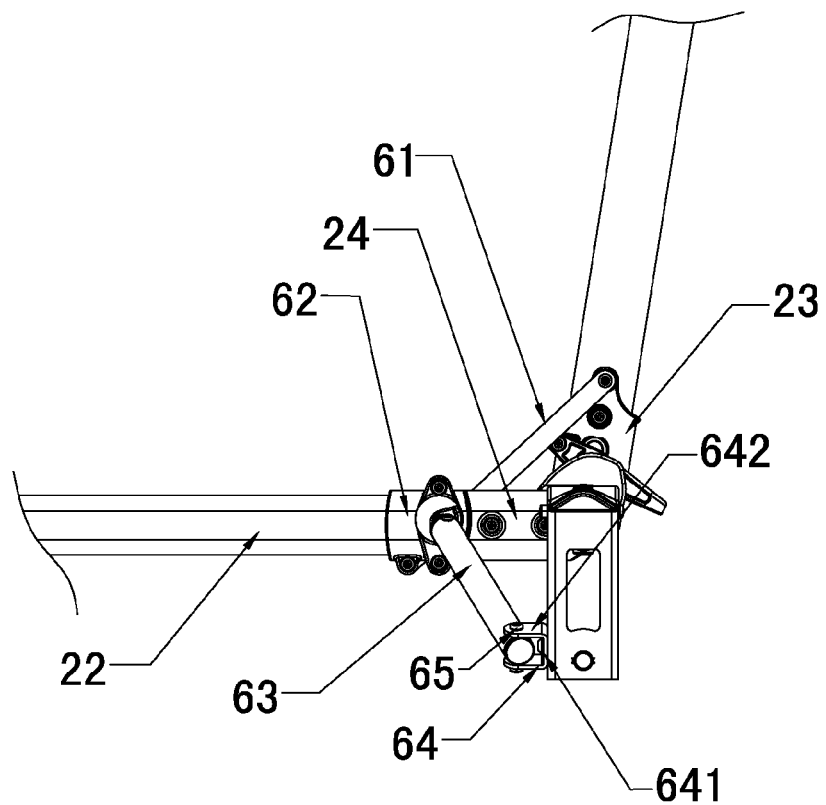
FIG. 4 is a local enlarged view of a push cart in Example 1 of the invention.
Figure 5:
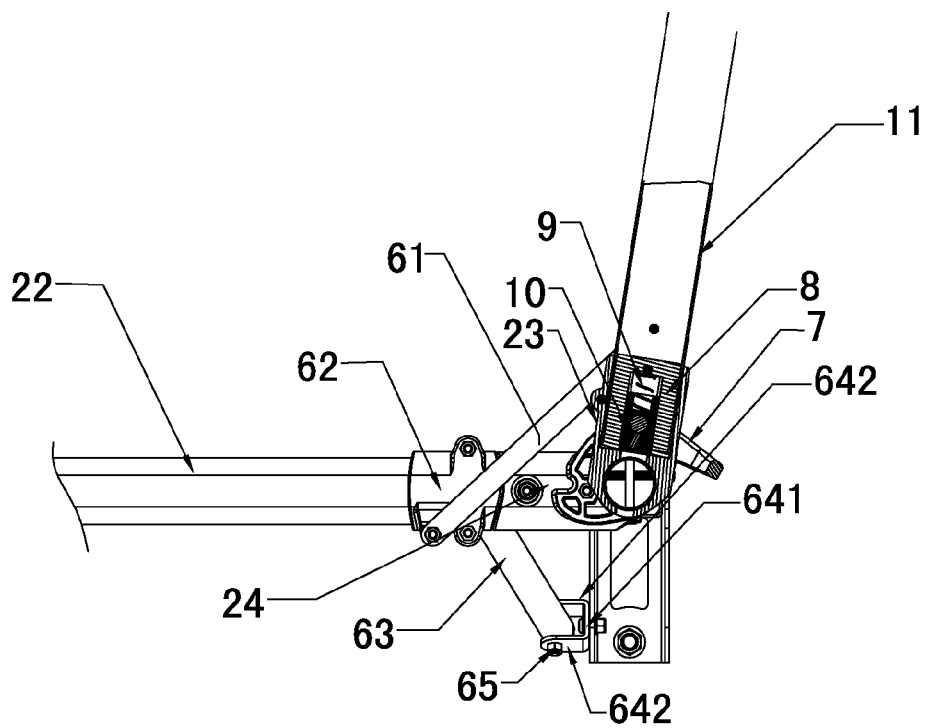
FIG. 5 is a sectional view of a push cart in FIG. 4 in an unfolded state of the invention.
Figure 6:
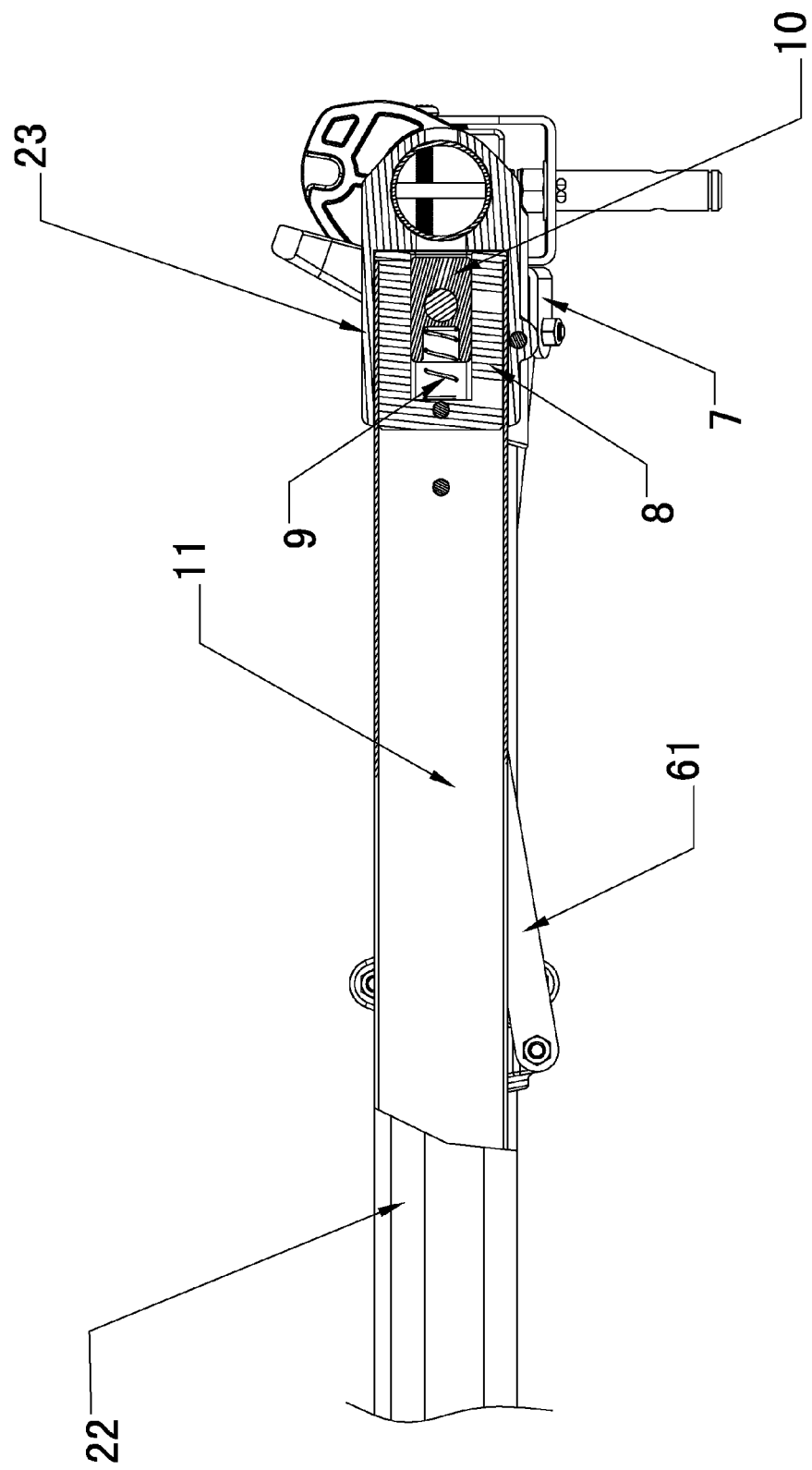
FIG. 6 is a sectional view of a push cart in FIG. 4 in a folded state of the invention.
Figure 7:
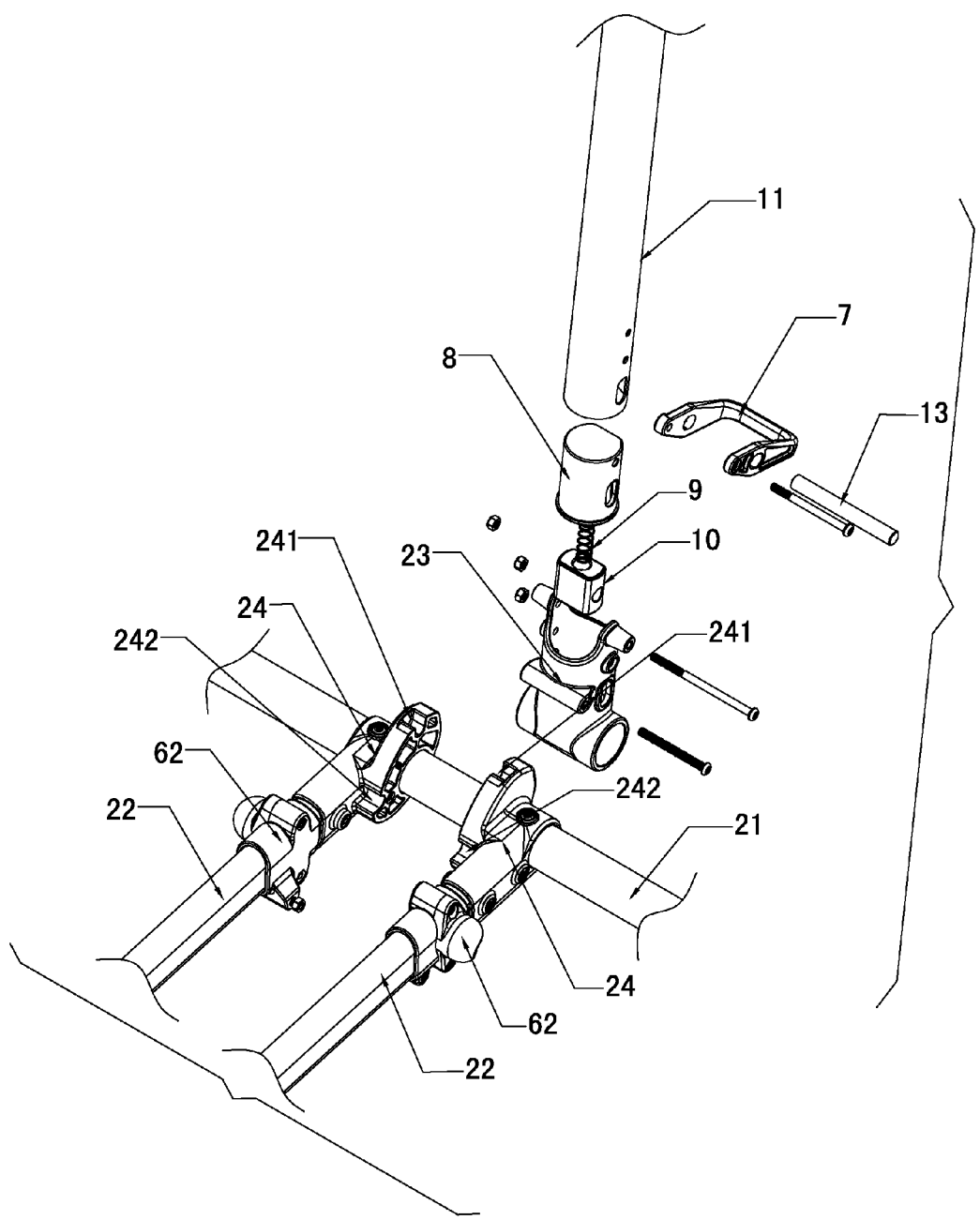
FIG. 7 is a second local exploded view of a push cart in Example 1 of the invention.
Figure 8:
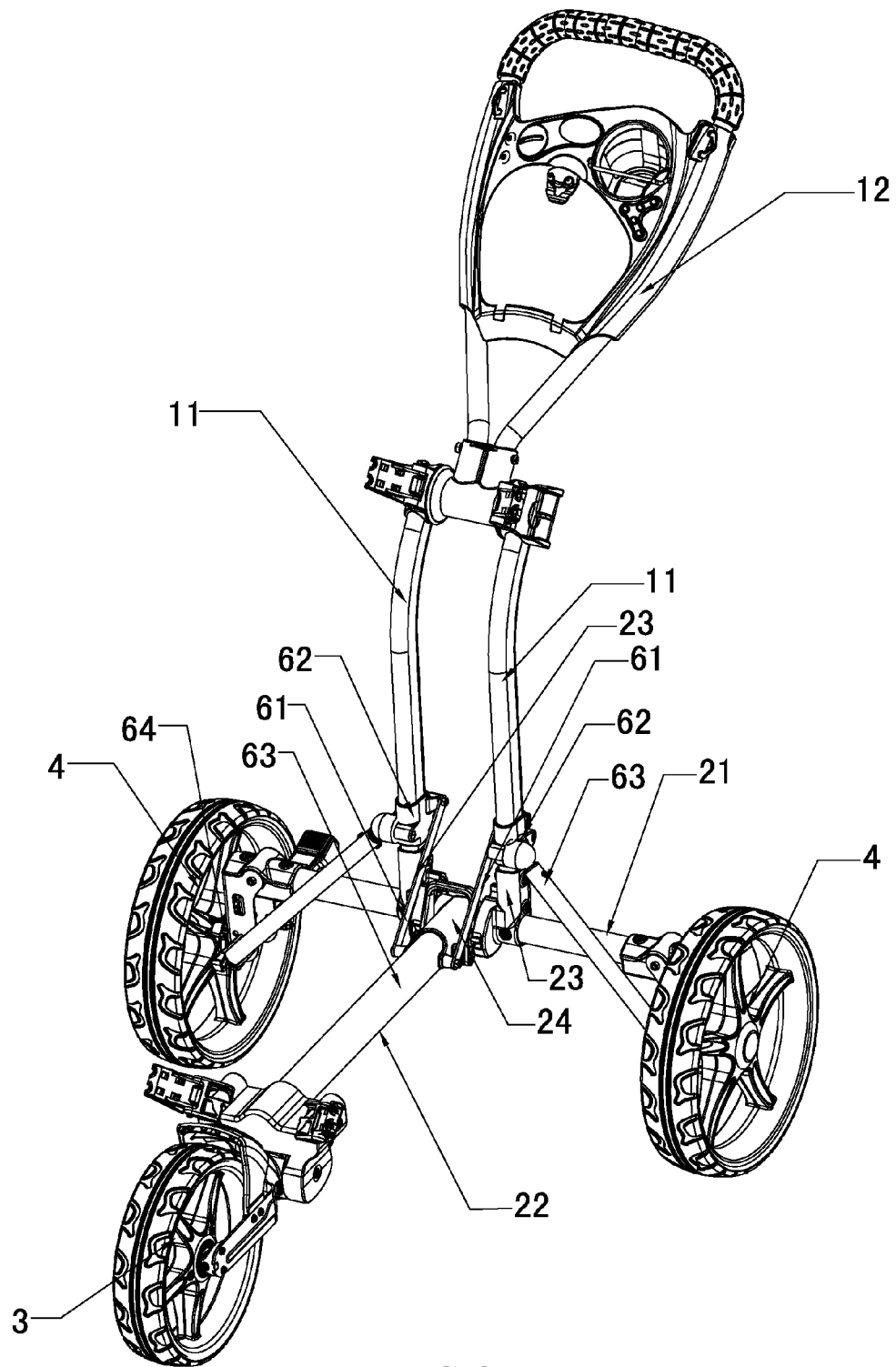
FIG. 8 is a stereogram of a push cart in an unfolded state in Example 2 of the invention.
Figure 9:
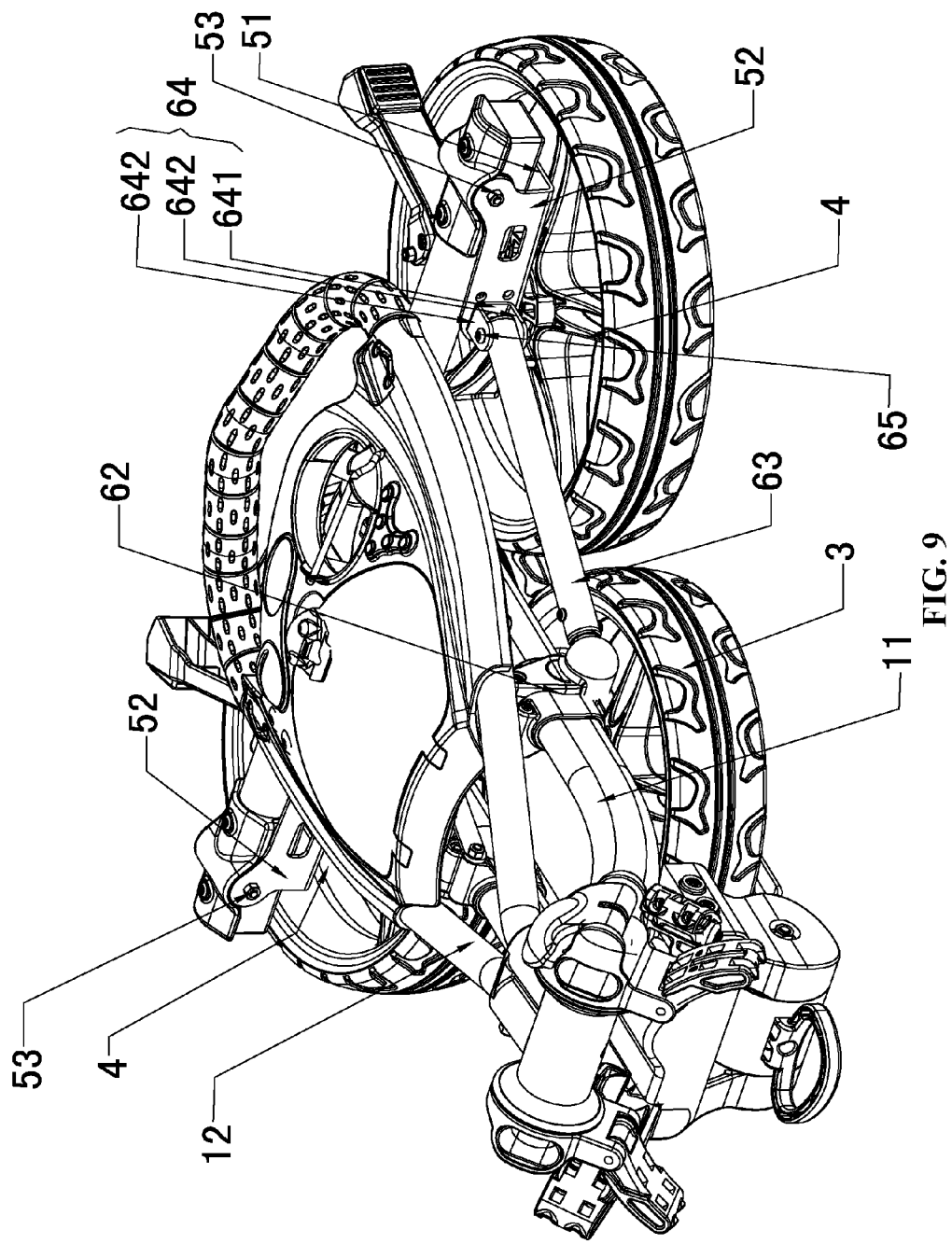
FIG. 9 is a stereogram of a push cart in a folded state in Example 2 of the invention.
Figure 10:
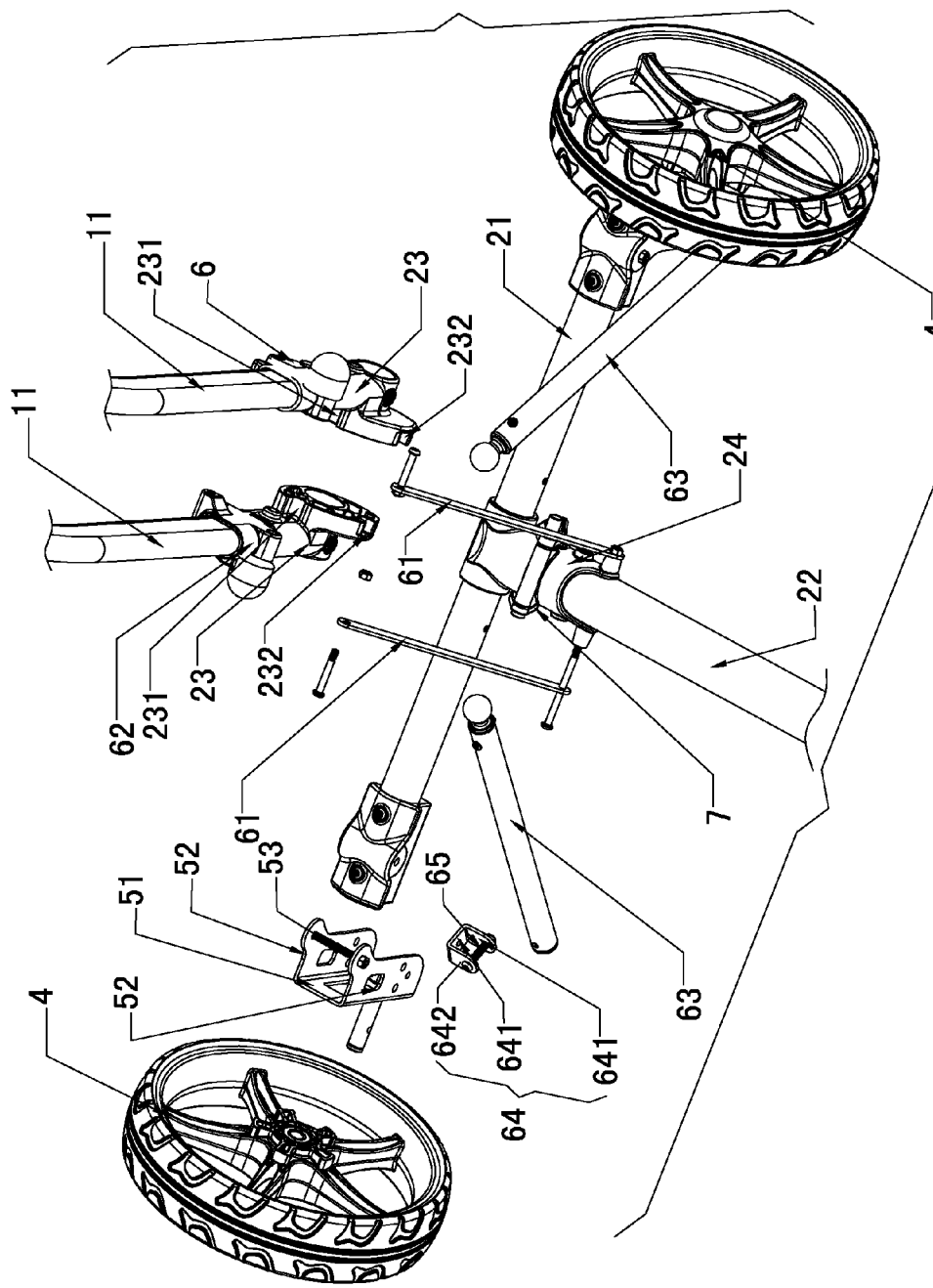
FIG. 10 is a first local exploded view of a push cart in Example 2 of the invention.
Figure 11:
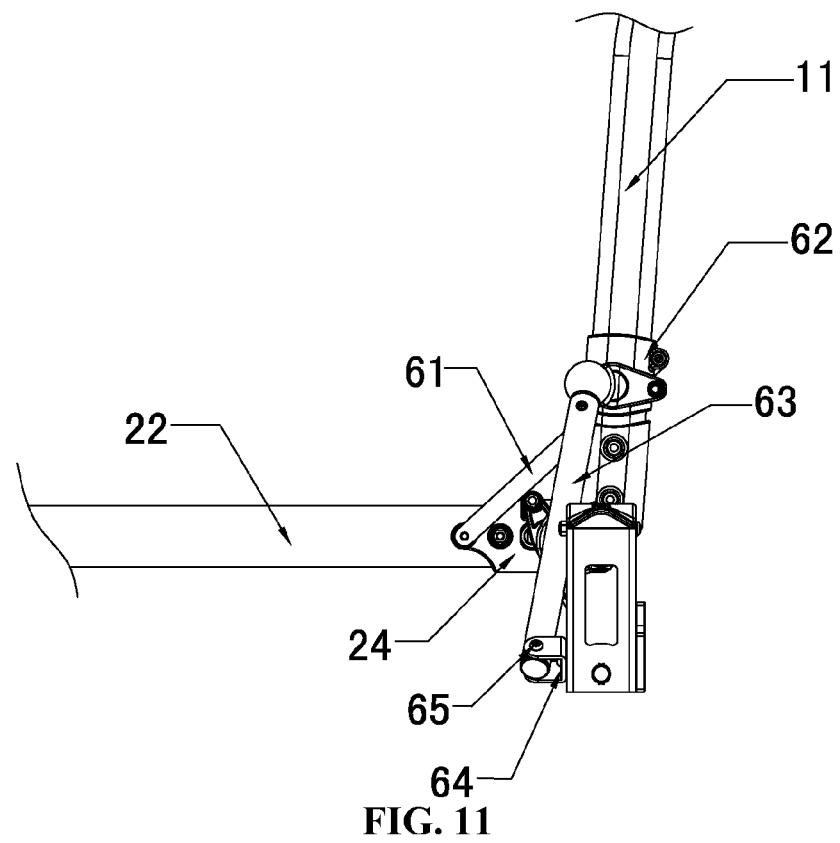
FIG. 11 is a local enlarged view of a push cart in Example 2 of the invention.
Figure 12:
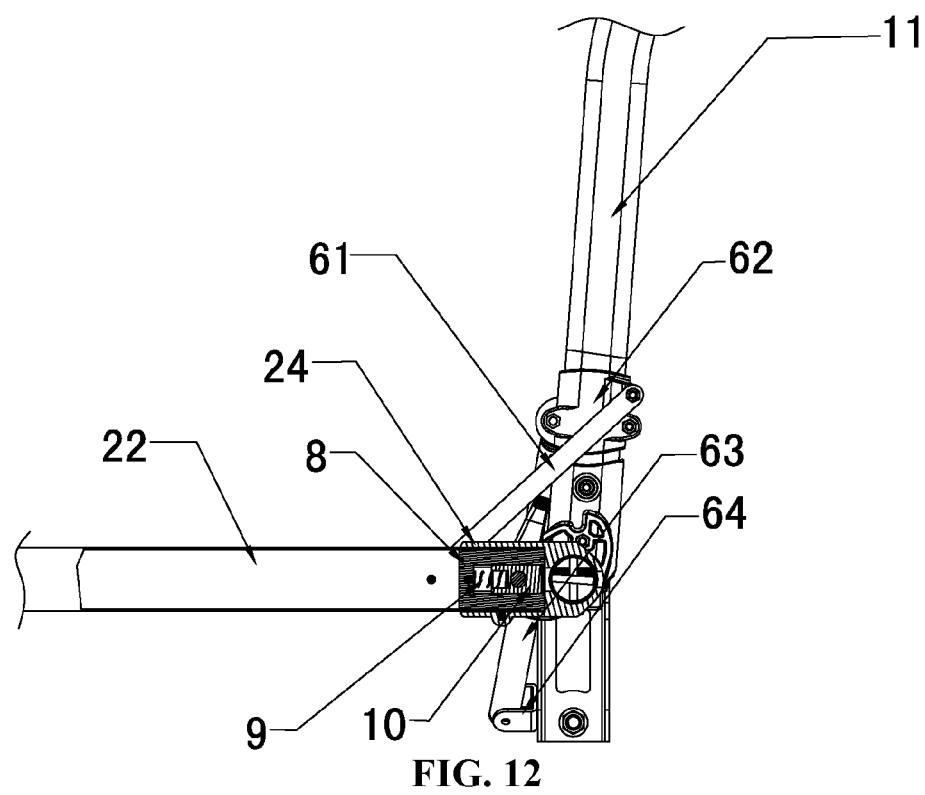
FIG. 12 is a sectional view of a push cart in FIG. 11 in an unfolded state of the invention.
Figure 13:
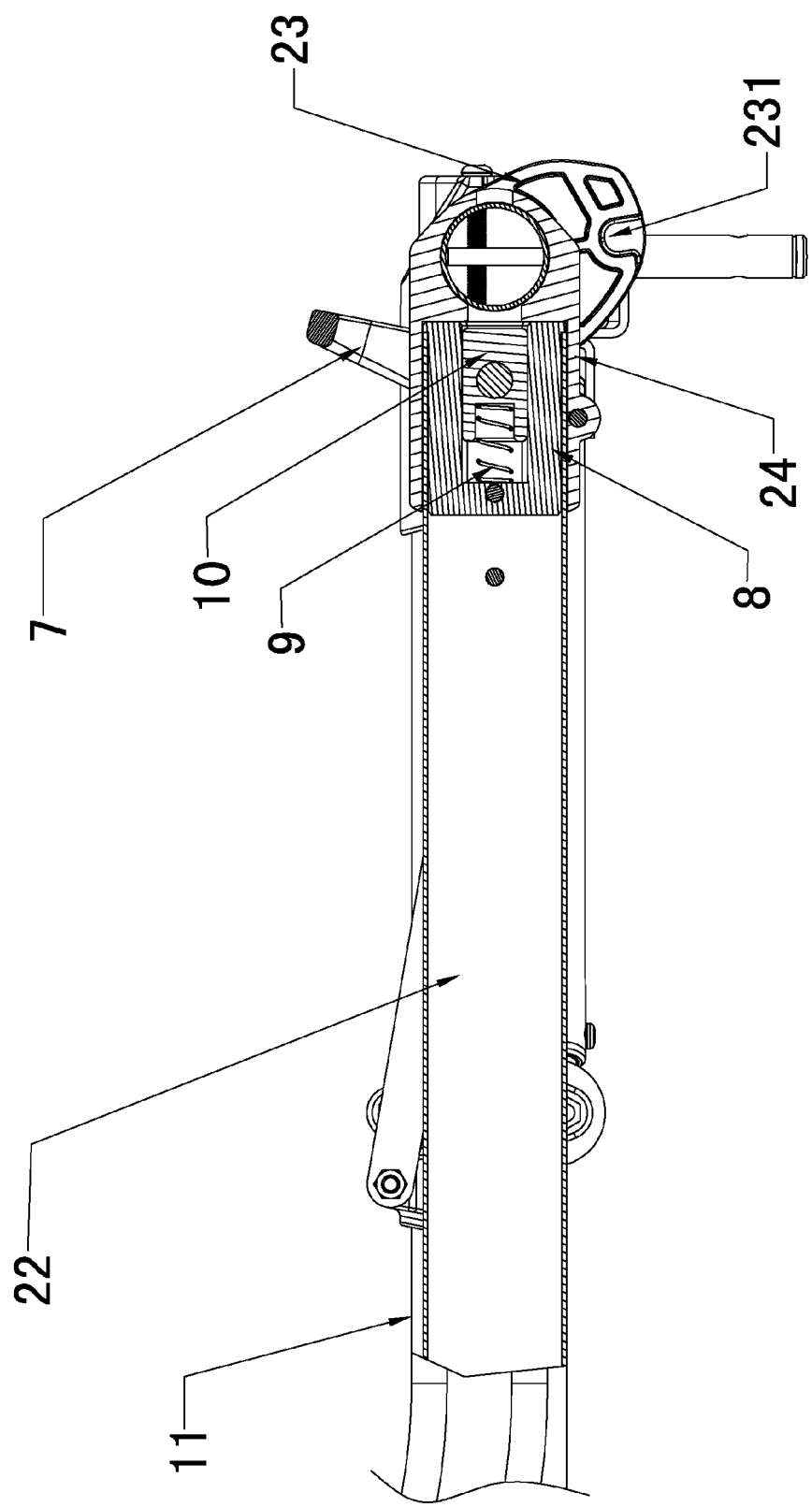
FIG. 13 is a sectional view of a push cart in FIG. 11 in a folded state of the invention.
Figure 14:
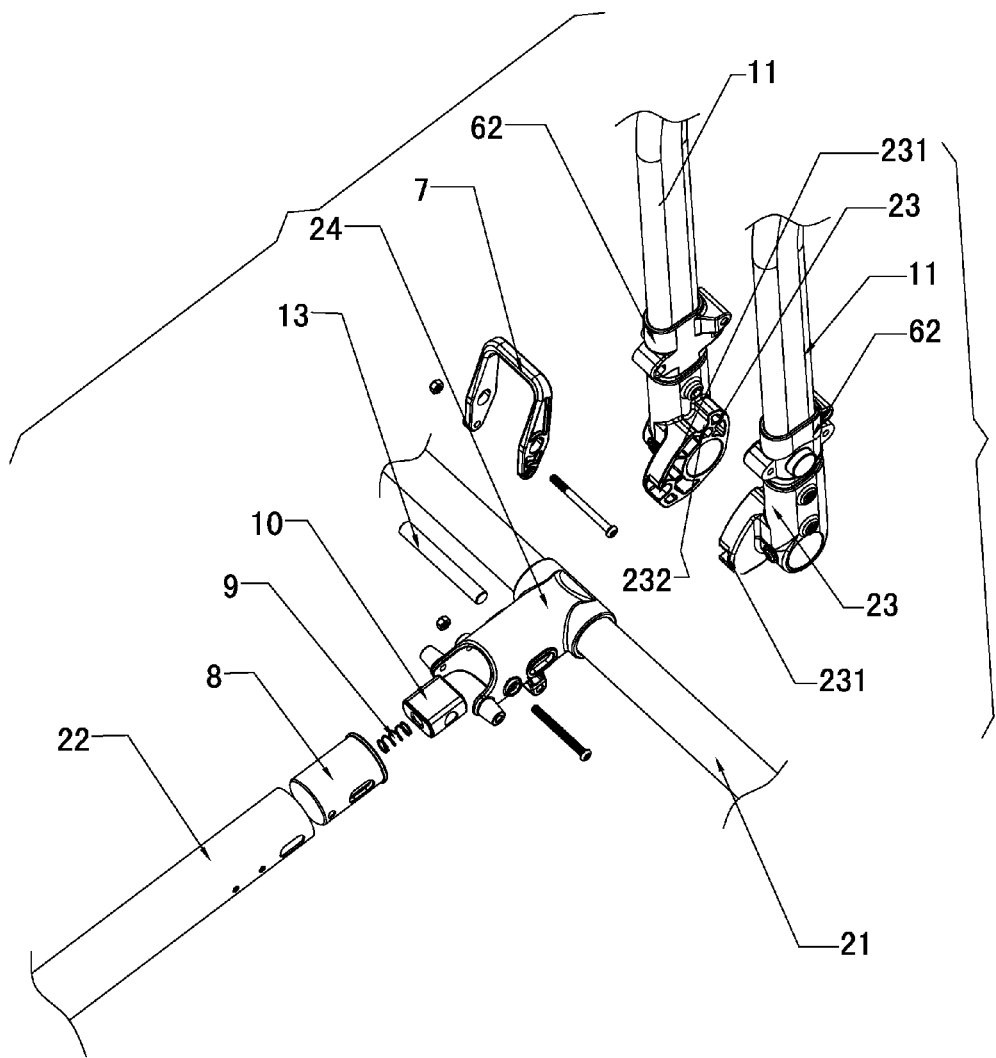
FIG. 14 is a second local exploded view of a push cart in Example 2 of the invention.

To further illustrate the invention, experiments detailing a push cart are described below. It should be noted that the following examples are intended to describe and not to limit the invention.

EXAMPLE 1

As shown in FIGS. 1-7, a golf push cart comprises an upper frame, a lower frame, a front wheel assembly 3, and two rear wheel assemblies 4. The lower frame comprises a rear wheel mounting pipe 21, and the upper frame is disposed on the rear wheel mounting pipe 21. The two rear wheel assemblies 4 are disposed on two ends of the rear wheel mounting pipe 21 via two fixed seats, respectively. The two fixed seats each comprises a first base plate 51 and two first side plates 52 respectively disposed at two sides of the first base plate 51. The rear wheel assemblies 4 are fixedly connected to the first base plates 51. The end of the rear wheel mounting pipe 21 is disposed between the two first side plates 52 and the three components are fixed by a pin 53. The fixed seat is connected to a connection rod linkage. The rotation of the upper frame drives the connection rod linkage to rotate and drive the fixed seats to flatten the rear wheel assemblies 4, or to enables the rear wheel assemblies 4 and the fixed seats to be vertical to the lower frame.

The upper frame comprises an upper pipe 11 and a handlebar 12 disposed on top of the upper pipe. The lower frame comprises two lower frame pipes 22 disposed in parallel on the rear wheel mounting pipe 21. The rear wheel mounting pipe 21 is provided with a joint seat 23 and two seat sleeves 24. The joint seat 23 is sandwiched in the two seat sleeves 24. The bottom of the upper pipe 11 is inserted in the joint seat 23, and the tails of two lower frame pipes 22 are inserted in the two seat sleeves 24, respectively. The front ends of the two lower frame pipes 22 are connected to the front wheel assembly 3.

The connection rod linkage comprises two linkage units. One linkage unit enables the upper pipe 11, one lower frame pipe 22 and one fixed seat to be connected, and the other linkage unit enables the upper pipe 11, the other lower frame pipe 22 and the other fixed seat to be connected. The linkage unit comprises a first connection rod 61, a first sliding block 62, and a second connection rod 63. The fixed seat is provided with an installation seat 64, and the installation seat 64 comprises a second base plate 641 and two second side plates 642 respectively disposed at two sides of the second base plate 641. The second base plate 641 is located at an outer side of the first side plate 52 and connected to the first side plate 52. The first sliding block 62 is sleeved on the lower frame pipe 22. One end of the first connection rod 61 is connected to the upper pipe 11, and the other end of the first connection rod 61 is connected to the first sliding block 62. One end of the second connection rod 63 is connected to the first sliding block 62, and the other end of the second connection rod 63 is sandwiched by the two second side plates 642, and the three components are fixed by a screw 65.

In this example, a U-shaped folding buckle 7 is disposed at an outer side of the joint seat 23, and the joint seat 23 is located in an opening of the folding buckle 7; two ends of the folding buckle 7 are coupled to the joint seat 23 via a rotating shaft; a tube plug 8 is disposed in the joint seat 23, and the tube plug 8 comprises a spring 9 and a second sliding block 10 disposed below the spring 9. A fixed bolt 13 runs through the folding buckle 7, the joint seat 23, the tube plug 8 and the second sliding block 10. The fixed bolt 13 is adapted to drive the second sliding block 10 to slide up and down in the joint seat 23. The two seat sleeves 24 each comprise a first locking groove 241 and a second locking groove 242; when the push cart is in an unfolded state, two ends of the fixed bolt 13 are clamped in two first locking grooves 241 of the two seat sleeves 24, respectively; and when the push cart is in a folded state, two ends of the fixed bolt 13 are clamped in two second locking grooves 242 of the two seat sleeves 24, respectively.

The working principle of the golf push cart is summarized as follows. When the push cart is in an unfolded state, two ends of the fixed bolt are clamped in two first locking grooves 241 of the two seat sleeves 24, respectively. As a result, the upper frame is fixed relative to the lower frame, and the two rear wheel assemblies 4 and the fixed seat are fixed and vertical to the ground. To fold the cart, the folding buckle 7 is first pulled upward. The folding buckle 7 rotates upward around the joint seat 23, and the fixed bolt 13 is driven by folding buckle 7 to move upward. The fixed bolt 13 drives the second sliding block 10 to move upward and press the spring 9. When the two ends of the fixed bolt 13 detach from two first locking grooves 241 of the two seat sleeves 24, the joint seat 23 is loosened and adapted to rotate around the lower frame. Rotate the upper pipe 11 toward the lower frame and loosen the folding buckle 7, when the upper pipe 11 is rotating, the first connection rod 61 rotates and drives the first sliding block 62 to slide toward the front end of the lower frame pipe 22. The first sliding block 62 drives the second connection rod 63, and the second connection rod 63 acts on the fixed seat via the installation seat 64. The fixed seat is pulled by the second connection rod 63 to rotate toward the lower part of the rear wheel mounting pipe 24. When the upper frame rotates to be flattened with the lower frame, the two ends of the fixed bolt 13 are clamped in two second locking grooves 242 of the two seat sleeves 24, so that the joint seat 23 is fixed, and the upper frame is fixed relative to the lower frame. In the state, the first base plates 51 of the fixed seats and the rear wheels of the rear wheel assemblies are all flattened with the lower frame, and thus, the upper frame, the lower frame, and the two rear wheels are folded in one step.

EXAMPLE 2

As shown in FIGS. 8-14, a golf push cart comprises an upper frame, a lower frame, a front wheel assembly 3, and two rear wheel assemblies 4. The lower frame comprises a rear wheel mounting pipe 21, and the upper frame is disposed on the rear wheel mounting pipe 21. The two rear wheel assemblies 4 are disposed on two ends of the rear wheel mounting pipe 21 via two fixed seats, respectively. The two fixed seats each comprises a first base plate 51 and two first side plates 52 respectively disposed at two sides of the first base plate 51. The rear wheel assemblies 4 are fixedly connected to the first base plates 51. The end of the rear wheel mounting pipe 21 is disposed between the two first side plates 52 and the three components are fixed by a pin 53. The fixed seat is connected to a connection rod linkage. The rotation of the upper frame drives the connection rod linkage to rotate and drive the fixed seats to flatten the rear wheel assemblies 4, or to enables the rear wheel assemblies 4 and the fixed seats to be vertical to the lower frame.

The upper frame comprises two parallel disposed upper pipes 11 and a handlebar 12 disposed on top of the two upper pipes. The lower frame comprises a lower frame pipe 22 disposed on the rear wheel mounting pipe 21. The lower frame pipe 22 is adapted to rotate relative to the rear wheel mounting pipe 21. The upper pipe 11 is disposed on the rear wheel mounting pipe 21. The rear wheel mounting pipe 21 is provided with two joint seats 23 and a seat sleeve 24. The seat sleeve 24 is sandwiched in the two joint seats 23. The two upper pipes 11 are inserted in the two joint seats 23, respectively, and the lower frame pipe 22 is inserted in the seat sleeve 24. The front end of the lower frame pipe 22 is connected to the front wheel assembly 3.

The connection rod linkage comprises two linkage units. One linkage unit enables the lower frame pipe 22, one upper pipe 11, and one fixed seat to be connected, and the other linkage unit enables the lower frame pipe 22, the other upper pipe 11, and the other fixed seat to be connected. The linkage unit comprises a first connection rod 61, a first sliding block 62, and a second connection rod 63. The fixed seat is provided with an installation seat 64, and the installation seat 64 comprises a second base plate 641 and two second side plates 642 respectively disposed at two sides of the second base plate 641. The second base plate 641 is located at an outer side of the first side plate 52 and connected to the first side plate 52. The first sliding block 62 is sleeved on the upper pipe 11. One end of the first connection rod 61 is connected to the lower frame pipe 22, and the other end of the first connection rod 61 is connected to the first sliding block 62. One end of the second connection rod 63 is connected to the first sliding block 62, and the other end of the second connection rod 63 is sandwiched by the two second side plates 642, and the three components are fixed by a screw 65.

In this example, a U-shaped folding buckle 7 is disposed at an outer side of the seat sleeve 24, and the seat sleeve 24 is located in an opening of the folding buckle 7; two ends of the folding buckle 7 are coupled to the seat sleeve 24 via a rotating shaft; a tube plug 8 is disposed in the seat sleeve 24, and the tube plug 8 comprises a spring 9 and a second sliding block 10 disposed behind the spring 9. A fixed bolt 13 runs through the folding buckle 7, the seat sleeve 24, the tube plug 8 and the second sliding block 10. The fixed bolt 13 is adapted to drive the second sliding block 10 to slide back and forward in the seat sleeve 24. The two joint seats 23 each comprise a first locking groove 231 and a second locking groove 232; when the push cart is in an unfolded state, two ends of the fixed bolt 13 are clamped in two first locking grooves 231 of the two joint seats 23, respectively; and when the push cart is in a folded state, two ends of the fixed bolt 13 are clamped in two second locking grooves 232 of the two joint seats 23, respectively.

The working principle of the golf push cart is summarized as follows. When the push cart is in an unfolded state, two ends of the fixed bolt 13 are clamped in two first locking grooves 231 of the two joint seats 23, respectively, and the two joint seats 23 are fixed on the lower frame. As a result, the upper frame is fixed relative to the lower frame, and the two rear wheel assemblies 4 and the fixed seat are fixed and vertical to the ground. To fold the cart, the folding buckle 7 is first pulled upward. The folding buckle 7 rotates upward around the seat sleeve 24, and the fixed bolt 13 is driven by folding buckle 7 to move upward. The fixed bolt 13 drives the second sliding block 10 to move forward and press the spring 9. When the two ends of the fixed bolt 13 detach from the two first locking grooves 231 of the two joint seats 23, the two joint seats 23 are loosened. Rotate the lower frame pipe 22 toward the upper frame and loosen the folding buckle 7, when the lower frame pipe 22 is rotating, the first connection rod 61 rotates and drives the first sliding block 62 to slide toward the upper end of the upper pipe 11. The first sliding block 62 drives the second connection rod 63, and the second connection rod 63 acts on the fixed seat via the installation seat 64. The fixed seat is pulled by the second connection rod 63 to rotate toward the lower part of the rear wheel mounting pipe 24. When the lower frame pipe 22 rotates to be flattened with the upper frame, the two ends of the fixed bolt 13 are clamped in the two second locking grooves 232 of the two joint seats 23, so that the two joint seats 23 is fixed, and the upper frame is fixed relative to the lower frame. In the state, the first base plates 51 of the fixed seats and the rear wheels of the rear wheel assemblies are all flattened with the lower frame, and thus, the upper frame, the lower frame, and the two rear wheels are folded in one step.

EXAMPLE 3

The example is basically the same as that in Example 1, and the difference therebetween is the structure of the installation seat 64 and the connection mode of the second connection rod 63 and the first sliding block 62 with the installation seat 64.

Figure 15:
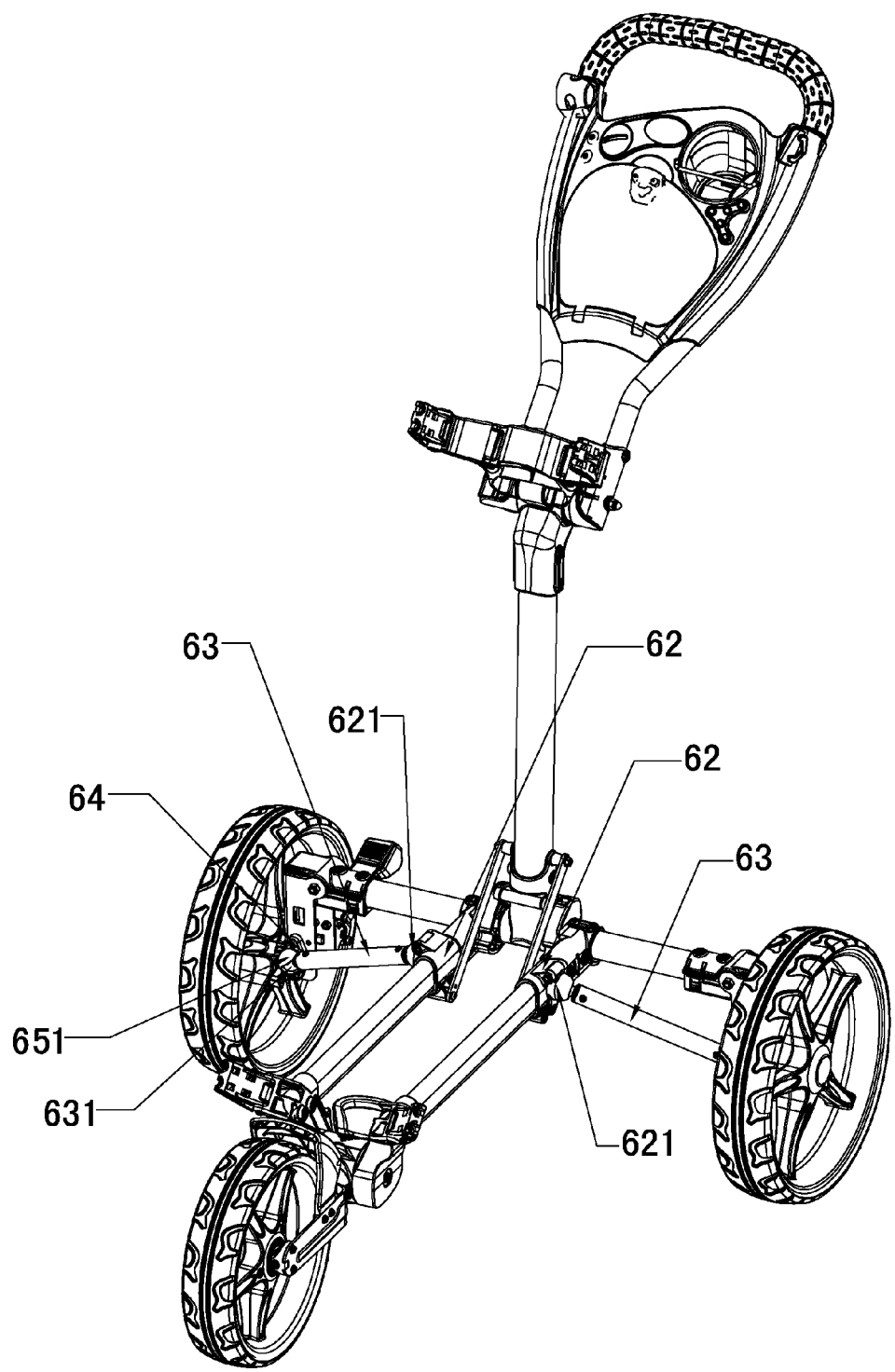
FIG. 15 is a stereogram of a push cart in an unfolded state in Example 3 of the invention.
Figure 16:
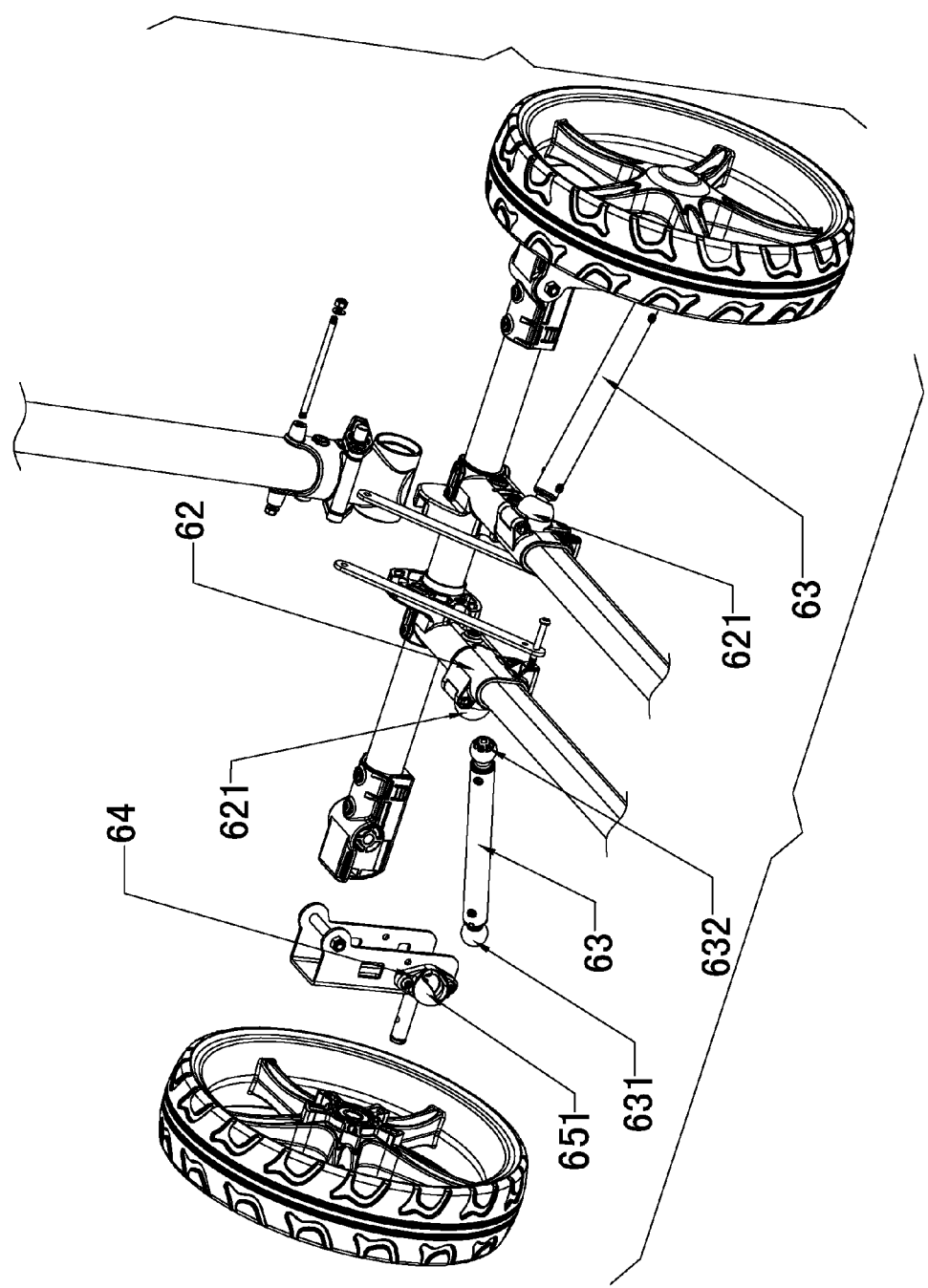
FIG. 16 is a local exploded view of a push cart in Example 3 of the invention.

As shown in FIGS. 15-16, the installation seat 64 comprises a first spherical connector 651, the first sliding block 62 is provided with a second spherical connector 621, one end of the second connection rod 63 is provided with a first spherical joint 631, and the other end of the second connection rod is provided with a second spherical joint 632. The first spherical joint 631 corresponds to and is received by the first spherical connector 651, and the second spherical joint 632 corresponds to and is received by the second spherical connector 621.

The first spherical joint 631 and the second spherical joint 632 of the second connection rod 63 can be integrated by one-step molding; so can the first spherical connector 651 and the second spherical connector 621, thereby greatly reducing the mold cost and improving the durability and stability of the push cart.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A push cart, comprising:
a frame, the frame comprising an upper frame and a lower frame, the upper frame comprising an upper pipe and a handlebar, and the lower frame comprising a rear wheel mounting pipe and two lower frame pipes;
a rear wheel assembly;
a front wheel assembly; and
a connection rod linkage, the connection rod linkage comprising two linkage units, and each of the two linkage units comprising a first connection rod, a first sliding block, and a second connection rod;
wherein:
the upper frame is disposed on the lower frame;
the rear wheel assembly is movably disposed on the rear wheel mounting pipe;
the rear wheel mounting pipe is connected to the upper pipe;
the front wheel assembly is disposed on the lower frame;
the frame is connected to the rear wheel assembly via the connection rod linkage;
in operation, the rotation of the upper frame drives the connection rod linkage to flatten the rear wheel assembly with the upper frame, or to unfold the rear wheel assembly;
the first connection rod is connected to the upper frame and the first sliding block;
the first sliding block is movably disposed on the lower frame;
the second connection rod is connected to the first sliding block and the rear wheel assembly;
the second connection rod is connected to the rear wheel assembly via a fixed seat;
the fixed seat is movably disposed on the rear wheel mounting pipe;
the fixed seat is fixedly connected to the rear wheel assembly;
the handlebar is disposed on top of the upper pipe;
the two lower frame pipes are disposed in parallel on the rear wheel mounting pipe;
the upper pipe is rotatably disposed on the rear wheel mounting pipe;
the first sliding block of one of the two linkage units is disposed on one of the two lower frame pipes, and the first sliding block of the other one of the two linkage units is disposed on the other one of the two lower frame pipes;
the rear wheel mounting pipe is provided with a joint seat and two seat sleeves;
the joint seat is sandwiched in the two seat sleeves;
the upper pipe is inserted in the joint seat, and the two lower frame pipes are inserted in the two seat sleeves, respectively;
a folding buckle is disposed at an outer side of the joint seat, and the joint seat is located in an opening of the folding buckle;
two ends of the folding buckle are coupled to the joint seat via a rotating shaft;
a tube plug is disposed in the joint seat, and the tube plug comprises a second sliding block and an elastic resetting mechanism operating to reset the second sliding block;
a fixed bolt runs through the folding buckle, the joint seat, the tube plug and the second sliding block;
the fixed bolt is adapted to drive the second sliding block to slide up and down in the joint seat;
the two seat sleeves each comprise a first locking groove and a second locking groove;
when the push cart is in an unfolded state, two ends of the fixed bolt are clamped in two first locking grooves of the two seat sleeves, respectively; and
when the push cart is in a folded state, two ends of the fixed bolt are clamped in two second locking grooves of the two seat sleeves, respectively.

2. The push cart of claim 1, wherein the elastic resetting mechanism comprises a spring, and the second sliding block is located below the spring.

3. A push cart, comprising:
a frame, the frame comprising an upper frame and a lower frame, the lower frame comprising a rear wheel mounting pipe;
a rear wheel assembly;
a front wheel assembly; and
a connection rod linkage, the connection rod linkage comprising two linkage units, and each of the two linkage units comprising a first connection rod, a first sliding block, and a second connection rod;

wherein:

the upper frame is disposed on the lower frame;

the rear wheel assembly is movably disposed on the rear wheel mounting pipe;

the rear wheel mounting pipe is connected to the upper frame;

the front wheel assembly is disposed on the lower frame;

the frame is connected to the rear wheel assembly via the connection rod linkage;

in operation, the rotation of the upper frame drives the connection rod linkage to flatten the rear wheel assembly with the upper frame, or to unfold the rear wheel assembly;

the first connection rod is connected to the upper frame and the first sliding block;

the first sliding block is movably disposed on the lower frame;

the second connection rod is connected to the first sliding block and the rear wheel assembly;

the second connection rod is connected to the rear wheel assembly via a fixed seat;

the fixed seat is movably disposed on the rear wheel mounting pipe;

the fixed seat is fixedly connected to the rear wheel assembly;

the fixed seat is provided with an installation seat, and the second connection rod is connected to the fixed seat via the installation seat;

the fixed seat comprises a first base plate and two first side plates respectively disposed at two sides of the first base plate;

the rear wheel assembly is fixedly connected to the first base plate;

one end of the rear wheel mounting pipe is disposed between the two first side plates; and the fixed seat is connected to the connection rod linkage.

4. The push cart of claim 3, wherein the installation seat comprises a second base plate and two second side plates respectively disposed at two sides of the second base plate; the second base plate is located at an outer side of the first side plate and connected to the first side plate.

5. The push cart of claim 3, wherein the installation seat comprises a first spherical connector, the first sliding block is provided with a second spherical connector, one end of the second connection rod is provided with a first spherical joint, and another end of the second connection rod is provided with a second spherical joint; the first spherical joint corresponds to and is received by the first spherical connector, and the second spherical joint corresponds to and is received by the second spherical connector.

6. A push cart, comprising:

a frame, the frame comprising an upper frame and a lower frame, the upper frame comprising two parallel disposed upper pipes and a handlebar disposed on top of the two upper pipes, and the lower frame comprising a lower frame pipe and a rear wheel mounting pipe;

a rear wheel assembly;

a front wheel assembly; and a connection rod linkage, the connection rod linkage comprising two linkage units, and each of the two linkage units comprising a first connection rod, a first sliding block, and a second connection rod;

wherein:

the upper frame is disposed on the lower frame;

the front wheel assembly is disposed on the lower frame;

the frame is connected to the rear wheel assembly via the connection rod linkage;

in operation, the rotation of the upper frame drives the connection rod linkage to flatten the rear wheel assembly with the upper frame, or to unfold the rear wheel assembly;

the first connection rod is connected to the lower frame and the first sliding block;

the first sliding block is movably disposed on the upper frame;

the second connection rod is connected to the first sliding block and the rear wheel assembly;

the lower frame pipe is disposed on the rear wheel mounting pipe;

the rear wheel assembly is movably disposed on the rear wheel mounting pipe;

the rear wheel mounting pipe is connected to the two upper pipes;

the lower frame pipe is adapted to rotate relative to the rear wheel mounting pipe;

the two upper pipes are disposed on the rear wheel mounting pipe;

the first sliding block of one of the two linkage units is disposed on one of the two upper pipes, and the first sliding block of the other one of the two linkage units is disposed on the other one of the two upper pipes;

the rear wheel mounting pipe is provided with two joint seats and a seat sleeve;

the seat sleeve is sandwiched in the two joint seats;

the two upper pipes are inserted in the two joint seats, respectively, and the lower frame pipe is inserted in the seat sleeve;

a folding buckle is disposed at an outer side of the seat sleeve, and the seat sleeve is located in an opening of the folding buckle;

two ends of the folding buckle are coupled to the seat sleeve via a rotating shaft;

a tube plug is disposed in the seat sleeve, and the tube plug comprises a second sliding block and an elastic resetting mechanism operating to reset the second sliding block;

a fixed bolt runs through the folding buckle, the seat sleeve, the tube plug and the second sliding block;

the fixed bolt is adapted to drive the second sliding block to slide up and down in the joint seat;

the two joint seats each comprise a first locking groove and a second locking groove;

when the push cart is in an unfolded state, two ends of the fixed bolt are clamped in two first locking grooves of the two joint seats, respectively; and when the push cart is in a folded state, two ends of the fixed bolt are clamped in two second locking grooves of the two joint seats, respectively.

7. The push cart of claim 6, wherein the elastic resetting mechanism comprises a spring, and the second sliding block is located behind the spring.

* * * * *